Feb. 6, 1968  W. H. MAYNE  3,367,443
METHOD AND APPARATUS FOR IMPROVING SEISMIC IMPACT SIGNALS
Filed June 16, 1965
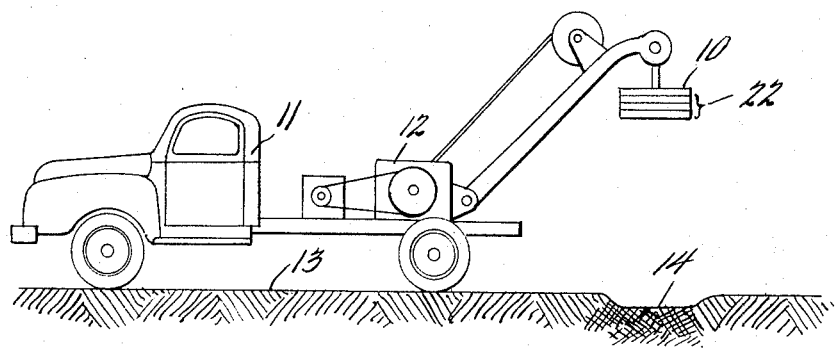
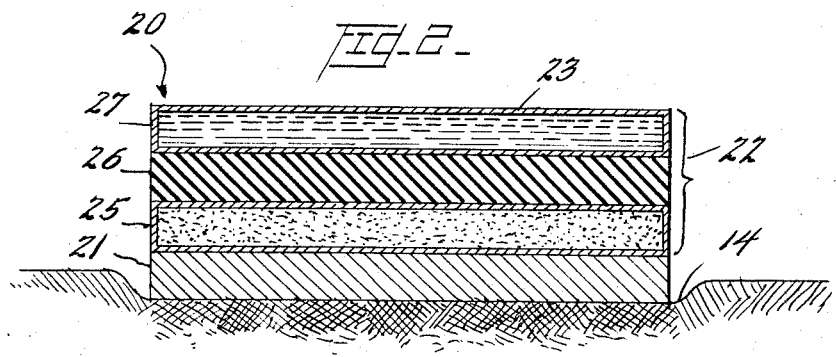
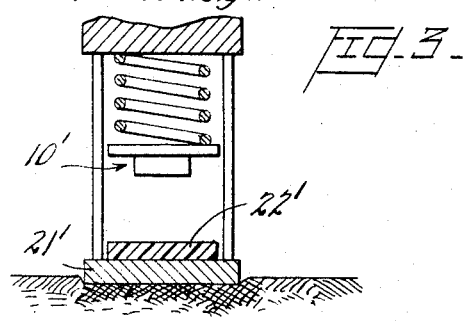
INVENTOR
William H. Mayne,
BY Watson, Cole, Grindle & Watson
ATTORNEYS

United States Patent Office 3,367,443
Patented Feb. 6, 1968

3,367,443
METHOD AND APPARATUS FOR IMPROVING
SEISMIC IMPACT SIGNALS
William H. Mayne, San Antonio, Tex., assignor to
Olive Scott Petty, San Antonio, Tex.
Filed June 16, 1965, Ser. No. 464,406
10 Claims. (Cl. 181—.5)

ABSTRACT OF THE DISCLOSURE

An impact buffer zone of special construction is provided for operation in a seismic system with a seismic impulse hammer that impacts the earth to provide a shock wave. The buffer zone, when coupled with a rigid plate on the earth, preferably has a specific thickness relationship to permit a seismic wave traverse time through the buffer zone greater than the traverse time through the rigid plate. The buffer zone may include multiple layers of elastic materials such as water, rubber, sand, oil, or foam plastic. Accordingly, means and methods are disclosed for elastically absorbing a portion of the impact of a moving mass generating seismic impulses in such a manner that seismic impulses are produced with a rise time of less than one millisecond.

---

This invention relates to the provision of seismic signals by means of impacting the earth with a moving mass such as a hammer.

Signals for use in seismic surveying or exploring systems have in the past been developed by impacting the earth with a dropping weight or some other moving mass. It has been difficult with such impulse generators however to generate signals of good uniformity in different locations because of variations in the characteristics of the earth's surface. It has been heretofore proposed in my copending application Ser. No. 314,583, filed Oct. 12, 1963, now Patent No. 3,283,846, for "Impulse Seismic Device," that a metal coupling plate be held firmly in contact with compacted earth to improve the efficiency and uniformity of the seismic impulses produced by the moving mass. However, under certain conditions the impact device itself may be damaged by excessive stresses after repetitive use by striking the metal plate at the highest possible impact which is attempted to develop seismic impulses of high amplitude and sharp rise times.

It is therefore a general object of the present invention to provide improved impact seismic devices which provide increased signal strength without significant increases in stress upon the impact mass.

It is another object of the invention to provide significant improvements in the amplitude and form of seismic signals which may be used in conventional seismic survey systems.

Another object of the invention is to provide methods and apparatus for improving seismic impact signals and for providing uniform results.

Thus in accordance with the present invention, impact seismic devices are provided with an intermediate coupling array between the impact hammer and the earth. This coupling array serves to improve the uniformity and efficiency of generating seismic impulses in the earth for use in a conventional seismic survey system. In general the coupling system provides a rigid coupling plate in intimate contact with the earth's surface and an elastic buffer material intermediate this plate and the impact hammer to reduce the stresses induced in the hammer. Therefore in accordance with a typical sequence of steps practiced in accordance with the teachings of this invention, the earth's surface is compacted to provide a bed for a rigid coupling plate in intimate contact with the earth. The hammer array then is moved into impact with the buffer material to create seismic shock waves by means of the resultant coupling plate motion.

A further step is to elastically control the impact stresses on the moving mass while maintaining an overall seismic impulse rise time and amplitude not significantly degraded from that obtained with the impact of the hammer on the rigid coupling plate on compacted earth. This method step is carried out by providing an elastic buffer material between a rigid coupling plate and the hammer which receives the impact and thus reduces stresses otherwise induced in the hammer.

The foregoing features of the invention together with other advantages are defined with particularity in the following specification, taken with reference to the accompanying drawings, wherein:

FIGURE 1 is a sketch of a mobile impact seismic device which may be used in accordance with the teachings of this invention;

FIGURE 2 is an elevation view in section of a coupling device for receiving the impact blow of a seismic hammer in accordance with a typical embodiment of this invention; and FIGURE 3 is an elevation view, partly in section, of an alternative embodiment of this invention.

Referring now particularly to the view shown in FIGURE 1, a seismic hammer 10 is provided as carried by a truck 11 or some other device which may move the impact mechanism 12 from location to location in the field. At the station 14 shown on the earth 13, the impulse is introduced by dropping hammer 10 and is used in a seismic survey system in the making of a seismic recording. Normally the hammer 10 is dropped or driven into impact with the typical velocity of 25 to 100 feet per second at a particular instant of time and thus introduces a seismic shock wave into the earth which is picked up and recorded on a synchronized time basis in a conventional seismic survey system. The earth is prepacked by the mass 10 as shown by indentation 14 to receive a coupling plate 21 illustrated in place in FIGURE 2. As shown in FIGURE 3, the coupler plate may be held in place by the weight of the vehicle and the hammer released for spring driven impact.

In operation a buffer plate 22 is employed between the coupling plate 21 and the moving mass of the hammer to receive its impact. This may be employed either as part of the hammer assembly as shown in FIGURE 1, or as part of the coupler plate as shown in FIGURE 2.

For purposes of specific illustration with the buffer plate 22 embodiment described herein, the effective thickness of the impact mass or head 10 might be for example 5.5 inches. The impact mechanism 12 is not shown but might be either a triggering device for dropping the hammer 10 or in the alternative a driven hammer as shown in the previously mentioned copending application, which is incorporated by reference as part of the background disclosure in this application.

As may be seen from FIGURE 2, the coupling device is inserted in the compacted earth indentation at station 14 and is used for receiving the impact of the moving mass. This particular embodiment has a rigid contact plate 21, which might be a steel plate, in intimate contact with the earth in the compacted area 14. In general this plate thickness is equal in thickness to the effective head thickness in order to provide proper impact without chatter. An elastic buffer layer 22 is introduced between this rigid coupling plate and the hammer impact surface 23 in order to elastically absorb the impact of the hammer to avoid excessive stresses in the hammer. While the consistency of this layer may vary, in this described embodiment the elastic buffer layer may consist of a layer of sand, which is confined in a suitable container, a layer of rubber, or a layer of water which is also suitably confined in a metallic container, or a combination thereof, as illustrated by the typical array 25, 26, and 27. Oil, foam, plastic or other materials may be substituted, as desired.

In general it has been found that no significant deterioration of seismic survey results will result if rise times of the order of .6 of a millisecond are not exceeded. This principle is used in connection with preparation of the elastic buffer material 22. Thus if this material has the propogation velocity of 3000 feet per second and is of such critical thickness that the travel time will be equal to the reflection time through the hammer head, the stress level in the machine or hammer head is reduced by a factor of 6 to 1, and under such circumstances the soil stress and resultant seismic amplitude is slightly increased. The rise time of the seismic pulse in this circumstance will be increased to about .3 of a millisecond which has more than adequate sharpness for seismic exploration purposes. The stress level can be reduced even further at the expense of increasing the rise time of the seismic impulse. Typical figures for stress in the head and in the soil and the associated rise times are shown in the following table:

STRESS

| With | Head, p.s.i. | Soil, p.s.i. | Rise Time, m/sec. |
| --- | --- | --- | --- |
| Plate | 63,000 | 1,290 | (¹) |
| Plate and Buffer: | | | |
| n=1 | 10,000 | 1,340 | .3 |
| n=3 | 6,000 | 980 | .6 |

¹ Fast.

For the value $n$ in the previous table, which is the ratio of the traverse time of the seismic impulse wave in the buffer and the head respectively, the following materials may be used in the typical elastic buffer zone 22:

| Material | n=1, in. | n=3, in. |
| --- | --- | --- |
| Water (4,800 f.p.s.) | 1.7 | 5.0 |
| Rubber (3,000 f.p.s.) | 1.0 | 3.1 |
| Sand, dry (2,500 f.p.s.) | 0.9 | 2.6 |

It may be noted from the data given in the foregoing tables that the stresses in the head are considerably reduced by providing the elastic buffer zone 22 with a traverse time for the seismic wave at least as great as that through the rigid coupling plate and the impact mass, and yet the seismic impulse in the soil is not seriously deteriorated in amplitude over the range in which it's rise time is acceptable for use in seismic survey systems. It is also to be recognized that with the foregoing apparatus and methods provided in accordance with this invention that uniformity will be maintained in the introduction of seismic impulses in various types of soil conditions at different survey locations. Furthermore the invention provides for longer life of seismic impact apparatus since the stress encountered by the impact mechanism 12 or head 10 are significantly reduced. This is particularly significant in connection with use of the power driven seismic head of the nature described in the above identified copending application.

As shown in FIGURE 3, the elastic buffer material may comprise a single layer 22' of plastic material producing an effective thickness and propagation time to satisfy the requirements for elastic stress relief and impedance match between the hammer 10' and coupling plate 21'.

Having therefore provided improved means and methods for generating seismic impact signals, those novel features believed descriptive of the nature and scope of the present invention are defined with particularity in the following claims.

What is claimed is:

1. In combination, a seismic system comprising an impact mass movable through the earth's atmosphere to an impact point in contact with the earth's surface thereby to create a seismic impulse traveling in the earth, a rigid coupling plate in intimate contact with the earth, at least one layer of buffer material with elastic properties for absorbing blows disposed in said atmosphere to couple the impact of said mass with said rigid coupling plate, wherein said layer of buffer material has a seismic wave traverse time at least as great as the seismic wave traverse time through said rigid coupling plate.

2. A combination as defined in claim 1 wherein the seismic wave traverse time through the buffer layer is at least as great as the traverse time through the thickness of said impact mass.

3. A combination as defined in claim 1 wherein the impact mass has an effective thickness equal to the thickness of said coupling plate.

4. A combination as defined in claim 1 wherein the seismic wave traverse times through the rigid coupling plate and the effective thickness of the impact mass are substantially equal and the seismic wave traverse time through the buffer is at least as great as either.

5. The combination as defined in claim 1 wherein said buffer material comprises multiple layers of at least two elastic materials from the group of water, rubber, sand, oil and foam plastic.

6. The combination as defined in claim 1 wherein the wave traverse time has a value between 1 and 5 times the traverse time through the thickness of said rigid coupling plate.

7. A combination as defined in claim 1, wherein the layer of buffer material is affixed to said mass and moves with it.

8. In combination, a rigid coupling plate in intimate contact with the earth, at least one layer of intermediary buffer material with a seismic wave traverse time at least as great as said plate and with elastic properties for absorbing blows, and an impact mass array arranged for impacting said buffer material.

9. The method of creating seismic impulses comprising the steps of (1) compacting the earth's surface, (2) intimately contacting the compacted surface with a rigid coupling material, (3) impacting said coupling material with a moving mass to create seismic shock waves, and (4) elastically absorbing a predetermined portion of the impact between the moving mass and the coupling material while retaining the resultant amplitude and rise time of the seismic impulses to produce a rise time of less than one millisecond.

10. The method defined in claim 9 wherein the step of elastically absorbing the impact of said moving mass is accomplished by establishing a ratio of one to five times between the seismic wave traverse time through an intermediary elastic layer and the traverse time through the head thickness of the moving mass.

References Cited

UNITED STATES PATENTS

| | | | |
| --- | --- | --- | --- |
| 1,996,401 | 4/1935 | Bowen | 173—131 X |
| 2,295,489 | 9/1942 | Riemenschneider | 173—131 |
| 2,816,618 | 12/1957 | Piety | 181—.5 |
| 3,189,121 | 6/1965 | Vander Stoep | 181—.5 |
| 2,712,443 | 7/1955 | Hohberger | 272—57.2 |

BENJAMIN A. BORCHELT, *Primary Examiner.*

G. H. GLANZMAN, *Assistant Examiner.*